Dec. 11, 1945.  E. C. STEINER  2,390,623
TRUE MOTION CONNECTING ROD
Filed April 24, 1943  2 Sheets-Sheet 1
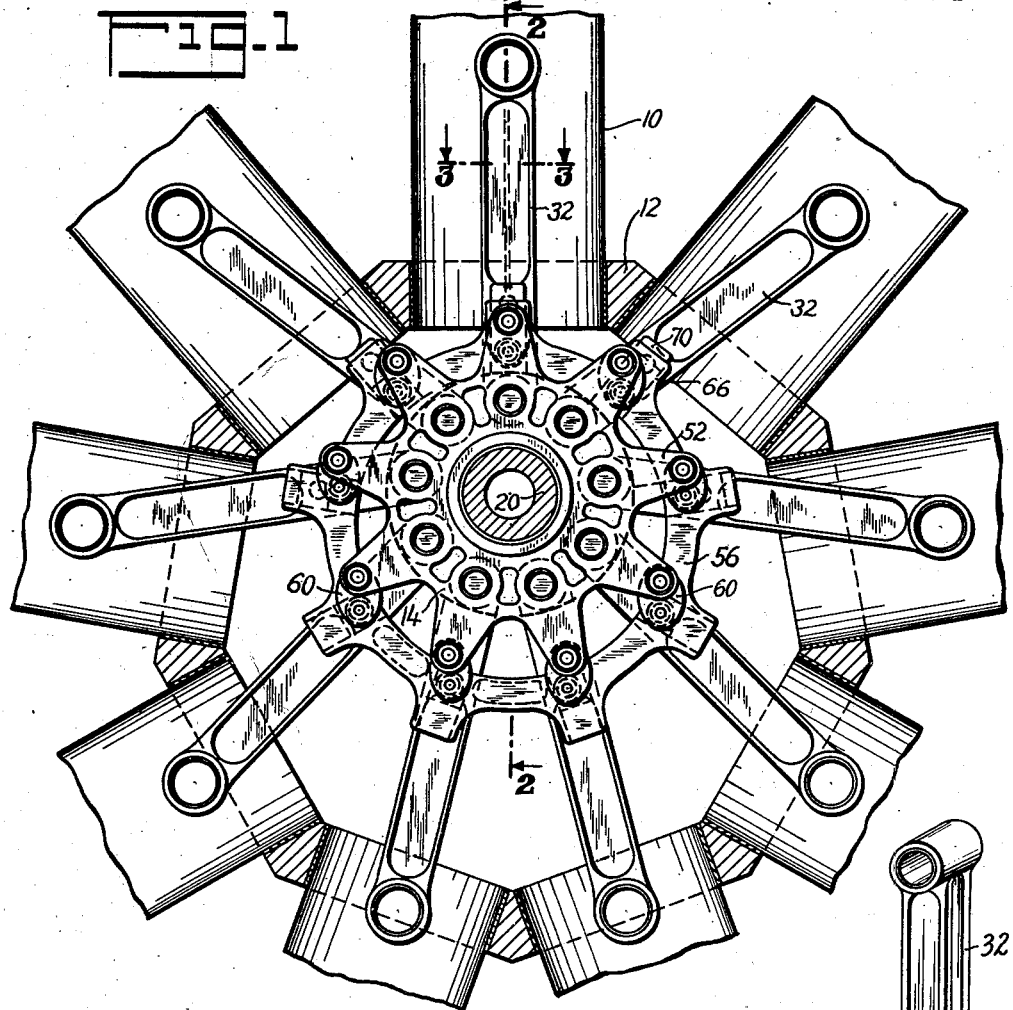
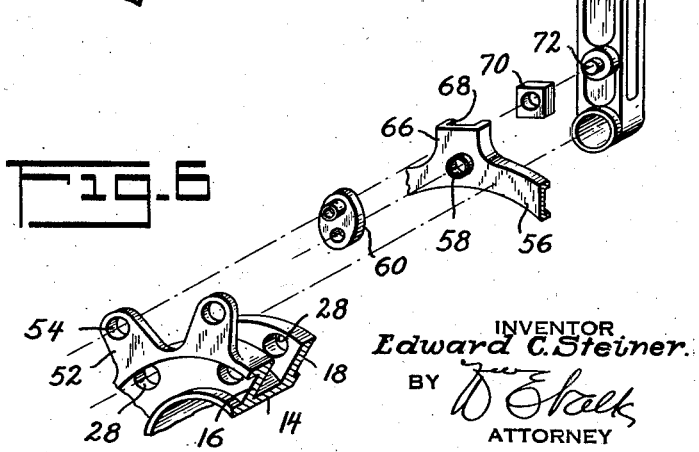
INVENTOR
*Edward C. Steiner.*
BY
ATTORNEY Dec. 11, 1945.  E. C. STEINER  2,390,623
TRUE MOTION CONNECTING ROD
Filed April 24, 1943  2 Sheets-Sheet 2
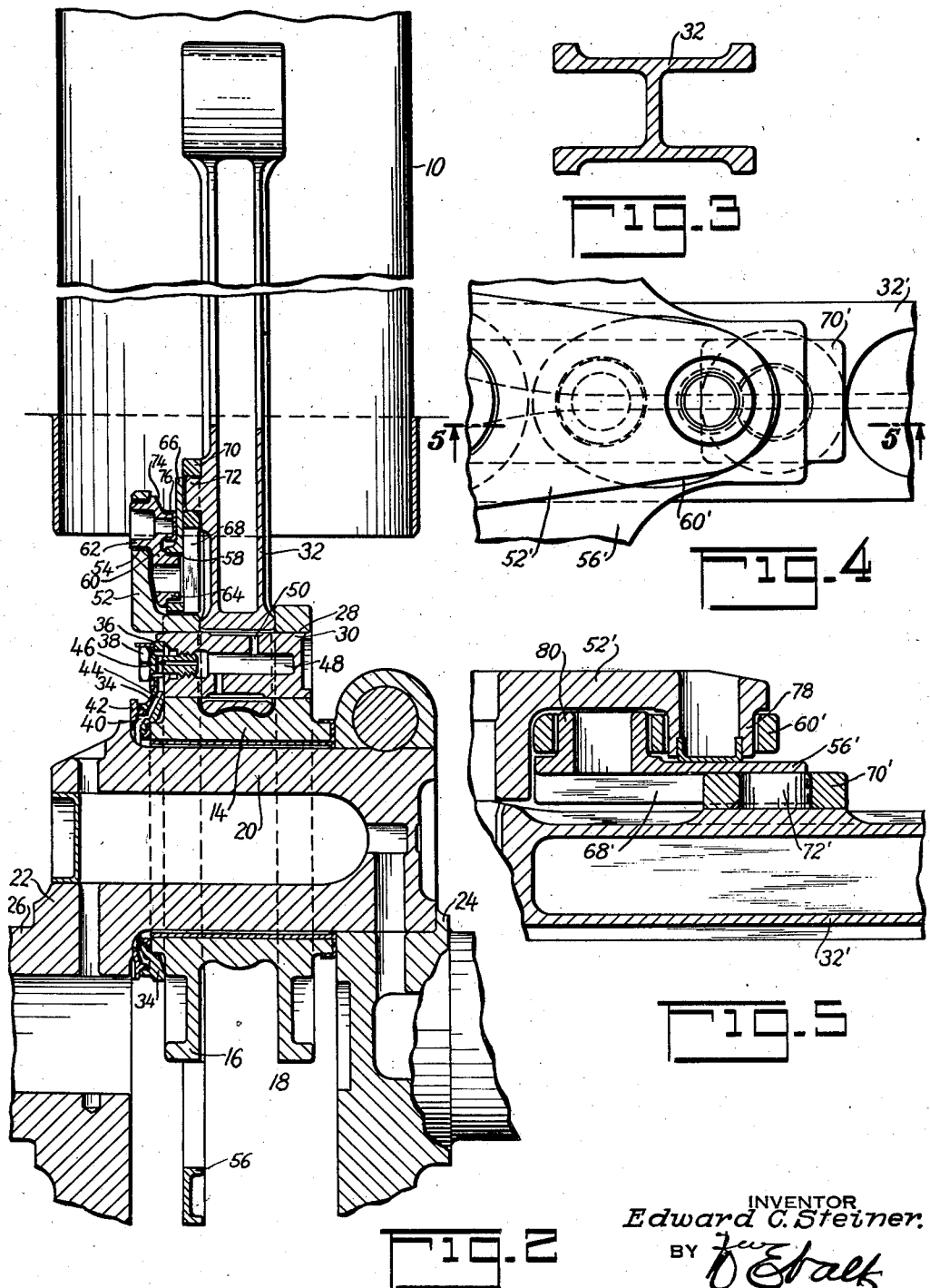
INVENTOR
Edward C. Steiner.
BY
ATTORNEY Patented Dec. 11, 1945

2,390,623

UNITED STATES PATENT OFFICE 2,390,623

TRUE MOTION CONNECTING ROD

Edward C. Steiner, Oklahoma City, Okla., assignor to Wright Aeronautical Corporation, a corporation of New York Application April 24, 1943, Serial No. 484,460

14 Claims. (Cl. 74—51)

This invention relates to a connecting rod structure for a radial cylinder internal combustion engine and is particularly directed to a so-called true-motion connecting rod system in which each rod has the same angular motion.

The conventional connecting rod system for radial cylinder engines comprises a master connecting rod journaled about the crankpin with the auxiliary connecting rods articulated about knuckle pins mounted about the hub of the master rod. In such a construction the hub of the master rod has a circular path while because of their eccentricity relative to the master rod the knuckle pins have various elliptical-like motions. As a result, the pistons connected to the various auxiliary rods have slight errors in displacement thereby introducing valve and spark timing errors.

Many attempts have been made to provide a so-called true motion type of connecting rod system for a radial cylinder engine in which each rod has the same motion, but for various reasons such prior attempts have not proved practical. Some of these prior art constructions involved the use of so-called slipper-type rods but because of their restricted bearing area such slipper type rods have been impractical. It is an object of this invention to provide a relatively simple connecting rod system in which all the rods are articulated by knuckle pins to a spool-like member journaled about the crankpin and in which means are provided to prevent rotation of the spool member about the crankpin axis. With such a construction each knuckle pin will have the same circular motion of translation. It is a further object of this invention to prevent rotation of the spool-like member about the crankpin axis by pivotally interconnecting this member to an annular slider or reaction plate restricted by the various connecting rods to a circular motion of translation. The spool member and slider plate are pivotally interconnected by a plurality of cranks or links equal in length to the difference in throw of the crankpin and the angular throw of the connecting rods at the point of connection to the slider plate.

Other objects of this invention will become apparent in reading the annexed detailed description in connection with the drawings, in which:

Fig. 1 is a radial section through a radial cylinder internal combustion engine showing the connecting rod system in elevation;

Figs. 2 and 3 are sectional views on the lines 2—2 and 3—3 of Fig. 1;

Fig. 4 is a plan view of a modification;

Fig. 5 is a section on the line 5—5 of Fig. 4; and

Fig. 6 is an exploded perspective view of a portion of Fig. 1.

Referring to the drawings, a plurality of radially disposed cylinders 10 are supported about the crankcase 12. A spool-like member 14 having parallel flanges 16 and 18 is journaled about a crankpin 20 extending between the crankcheeks 22 and 24 of a crankshaft 26. These parallel flanges are provided with a plurality of circumferentially spaced openings 28 for the reception of knuckle pins 30 upon which are journaled the connecting rods 32. As far as the knuckle pins are concerned, the construction of the spool member 14 is similar to the hub end of the conventional master rod. Accordingly, the construction of the knuckle pin locking and lubricating means may also be conventional.

An annular locking plate 34 having radial extensions 36 engaging the knuckle pins 30 through screws 38 provides means for locking the knuckle pins in place. The locking plate 34 is provided with an annular groove 40 for the reception of an end seal member 42. Also, oil passageways 44 are provided through each extension 36 for cooperation with drillings 46, 48 and 50 in the knuckle pin assembly to provide lubrication for the knuckle pin. For a more complete description of this knuckle pin and locking plate assembly, reference is made to Patent No. 2,272,172, issued to Henry C. Hill February 10, 1942. However, it should be understood that any conventional knuckle pin assembly may be used without altering this invention. At this point it should be pointed out that in view of the similarity of the spool member 14 to the hub end of a conventional master rod, the true motion connecting rod system of this invention may be readily substituted for the master connecting rod systems now in use on radial cylinder engines.

The spool member 14 is provided with a plurality of radially extending arms 52 disposed above each knuckle pin and each of said arms is provided with a hole 54 at its outer end. An annular reaction or slider plate 56 is disposed between the arms 52 and the connecting rods, and is provided with a plurality of bosses each provided with a bore 58. The openings 54 and bores 58 are circumferentially disposed on circles of the same radius. A plurality of small links or cranks 60 are disposed between the extension arms 52 and the slider plate 56 and are provided with opposed bosses 62 and 64 for reception in the openings 54 and bores 58 respectively. Accordingly, the cranks 60 pivotally interconnect the spool member 14 and the slider plate 56.

The slider plate 56 is provided with a plurality of extension arms 66 having radially extending channels 68 for the reception of slider or bearing blocks 70, pivotally mounted on pins 72 projecting from the connecting rods. For structural reasons the annular portion of the slider plate is also channel-shaped. Also, in order to take up lateral slack between the various members, the cranks 60 are each provided with a hub 74 facing the slider plate 56, and a bushing 76 is interposed between these members. It will be noted that the circumferential spacing of the grooves 68 correspond to the angular disposition of the cylinders 10.

Now if the spool member 14 has a circular motion of translation, then each knuckle pin will have a circular motion. That is, if the spool member 14 is restrained from rotation about the crankpin 20, each knuckle pin will have a circular motion having a radius equal to the throw of crank 20, thereby providing a true motion connecting rod system. Then the piston or wrist pin end of each connecting rod will have a reciprocating linear motion corresponding to the diameter of the circle to be described by the knuckle pins, and any intermediate point on each connecting rod will describe an elliptical-like path. Each such elliptical-like path will have a major axis alined with the axis of the associated cylinder and of a length equal to the diameter of the circle described by the knuckle pin and each such path will have a minor axis of such length that the ratio of the length of the major and minor axes is equal to the ratio of the connecting rod length to the distance that the particular intermediate point is from the wrist pin. The slider blocks 70 will have such an elliptical-like motion since they are pivotally mounted at intermediate points on each connecting rod. These slider blocks are received in the radial channel 68 of the slider plate so that only the lateral motion of each block is transmitted to the slider plate. Therefore, as a result of the symmetry of the arrangement of the slider plate 56 and the pivotally connected spool member 14 relative to the cylinder axes, the slider plate motion will be limited to a circular motion of translation having a diameter equal to the length of the minor axis of the elliptical-like path of the slider blocks 70.

The ends of the crank 60 are pivotally connected to the spool member 14 and slider plate 56 respectively at points of equal radius on these annular members. Therefore, these links will restrict the relative motion of these members so that they may only have relative motion of translation. Now, as above pointed out, the connecting rods through the slider block 70 limit the slider plate 56 to a circular motion of translation so that the spool member 14 necessarily will also have such a motion. That is, the links 60 and the slider plate 56 restrict the motion of the spool member 14 so that this member cannot rotate about the axis of the crankpin thereby assuring a similar circular motion for all of the knuckle pins.

As stated above, both the spool member 14 and the reaction plate 56 have a circular motion of translation. The motion of the spool member 14 is such that every point on this member has a circular path having a radius equal to the throw of the crankpin 20. The slider or reaction plate 56 has a circular motion of translation such that every point on this plate has a circular path having a radius equal to one-half the minor axis of the elliptical-like path of the slider block 70. In order to permit complete relative circular motion of translation between the spool member 24 and the slider plate 56, the links or cranks 60 must be equal in length to the difference in the radii of the circles described by points on the spool member and slider plate, respectively. That is, the length of the crank 60 is equal to the difference between the throw of the crankpin 20 and the product of this crankpin throw with the ratio of the distance of the slider block 70 from the wrist pin end of the connecting rod to the link of the connecting rod.

It should be noted that although each connecting rod is pivotally connected to the slider plate by a slider block assembly, it is only necessary that two or more blocks be used. However, with slider blocks 70 disposed intermediate each connecting rod and the slider or reaction plate 56, the torque reaction of the spool member 14 due to the use of articulated rods is distributed to all the cylinder pistons in the system. Also, although only one reaction or slider plate 56 has been described, a second reaction ring obviously may be provided on the other side of the connecting rods merely by duplicating the structure cooperating with the reaction or slider plate disclosed. Two such reaction plates may be desirable in order to eliminate eccentric loading.

Figs. 4 and 5 disclose a slight modification in which the corresponding parts have been designated by primed numerals. In this modification, a link 60' has been substituted for the crank 60 and this link is journaled over pins 78 and 80 formed on the extension arms 52' and slider plate 56' respectively. This form of invention is otherwise equivalent to Figs. 1 to 3.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a connecting rod assembly for a radial cylinder engine including a crankpin, a member journaled about said crankpin, a plurality of connecting rods articulated to said member, means for preventing rotation of said member about the axis of the crankpin, said means comprising a reaction ring pivotally connected to said member by a plurality of interconnecting links, and bearing blocks pivotally mounted on said connecting rods and received within correspondingly spaced radial grooves in the reaction ring.

2. A connecting rod assembly for a crankshaft having a crankpin, an annular member journaled about said crankpin, a plurality of connecting rods pivotally connected to said member, and means for preventing rotation of said member about the axis of said crankpin, said means comprising a member having a pivotal connection with said annular member and having a separate pivotal connection with said connecting rods.

3. In a connecting rod assembly for a radial cylinder engine including a crankpin, an annular spool-like member journaled about said crankpin and having a pair of spaced radial flanges, a plurality of knuckle pins extending between and supported by said flanges each having a connecting rod articulated thereto, and an annular member pivotally connected to said spool-like member and having a sliding connection with said connecting rods.

4. A connecting rod assembly for a crankshaft having a crankpin, an annular member journaled about said crankpin, a plurality of connecting rods pivotally connected to said member, and a second annular member pivotally connected to said first annular member and having a sliding connection with said connecting rods.

5. In a connecting rod assembly for a radial cylinder engine including a crankpin, a first annular member journaled about said crankpin, a plurality of connecting rods articulated to said member, a second annular member pivotally connected to said first annular member by a plurality of interconnecting links, and means pivotally mounted on two or more of the connecting rods and slidably received within radial grooves in said second annular member.

6. In a connecting rod assembly for a multi-cylinder engine including a crankpin and in which the cylinders are radially disposed about the axis of the engine crankshaft, a first annular member journaled about said crankpin, a plurality of connecting rods articulated to said member, a second annular member, a plurality of links having their opposed ends pivotally connected respectively to said first and second annular members on circles of equal radius, said annular member having a plurality of radial grooves, and a plurality of bearing blocks each pivotally mounted on one of said connecting rods and received within said grooves.

7. In a connecting rod assembly for a radial cylinder engine including a crankpin, an annular spool-like member journaled about said crankpin and having a pair of spaced radial flanges, a plurality of knuckle pins extending between and supported by said flanges each having a connecting rod articulated thereto, a corresponding number of radial arms extending from one of said flanges, an annular member disposed between said arms and said connecting rods, and a plurality of links disposed between said arms and annular member and having their opposed ends pivotally connected to said arms and to said annular member on circles of equal radius, said annular member having a plurality of radial grooves, and a plurality of bearing blocks each pivotally mounted on one of said connecting rods and received within said grooves.

8. In a connecting rod assembly for a radial cylinder engine including a crankpin, a first annular member journaled about said crankpin, a plurality of connecting rods articulated to said member, a second annular member pivotally connected to said first annular member by a plurality of interconnecting links, a plurality of radial grooves in said second annular member having an angular spacing corresponding to the angular disposition of said cylinders, and means on said connecting rods slidably received in said grooves.

9. A connecting rod assembly between a plurality of piston-like members and a crankshaft having a crankpin, a first annular member journaled about said crankpin, a plurality of connecting rods each pivotally connected at one end to said first member and at its other end to one of said pistons, a plurality of links pivotally interconnecting said first and second annular members, and means interconnecting said connecting rods and second annular member, said last-named means being arranged so that only the lateral motion of each connecting rod transverse to the axis of its associated piston-like member is imparted to said second annular member.

10. In a connecting rod assembly for a radial cylinder engine including a crankpin, a first annular member journaled about said crankpin, a plurality of connecting rods articulated to said member, a second annular member pivotally connected to said first annular member by a plurality of interconnecting links, and cooperating cam follower and groove formations on said second annular member and connecting rods.

11. In a connecting rod assembly for a radial cylinder engine including a crankpin, an annular member journaled about said crankpin, a plurality of connecting rods articulated to said member, and means for preventing rotation of said member about the axis of said crankpin, said means comprising a second annular member and a plurality of parallel links each having its one end pivotally connected to one of said annular members and its other end pivotally connected to the other of said annular members such that said links remain parallel during engine operation.

12. In a connecting rod assembly for a radial cylinder engine including a crankpin, an annular member journaled about said crankpin, a plurality of connecting rods articulated to said member, and means for preventing rotation of said member about the axis of said crankpin, said means comprising a second annular member and a plurality of parallel links each having its one end pivotally connected to one of said annular members and its other end pivotally connected to the other of said annular members such that said links remain parallel during engine operation, said second annular member being pivotally connected to said connecting rods.

13. A connecting rod assembly for a crankshaft having a crankpin, said assembly comprising an annular member journaled about said crankpin, a plurality of connecting rods articulated to said member, and means for preventing rotation of said member about the axis of said crankpin, said means comprising a second annular member and a plurality of parallel links of equal length each having its one end pivotally connected to one of said members and its other end pivotally connected to the other of said members, each of said pivoted connections being at the same radial distance from the center of its associated annular member, said links remaining parallel during crankshaft operation.

14. In a connecting rod assembly for a radial cylinder engine including a crankpin, an annular member journaled about said crankpin, a plurality of connecting rods articulated to said member, and means for preventing rotation of said member about the axis of said crankpin, said means comprising a second annular member, a plurality of parallel links of equal length each having its one end pivotally connected to one of said members and its other end pivotally connected to the other of said members, each of said pivotal connections being at the same radial distance from the center of its associated annular member, and means interconnecting said connecting rods and said second annular member in such a manner as to permit relative motion of each of said connecting rods and said second annular member in the direction of the axis of the cylinder associated with said connecting rod but so as to prevent relative motion at right angles thereto.

EDWARD C. STEINER.